(12) United States Patent
Lothberg et al.

(10) Patent No.: US 6,775,295 B1
(45) Date of Patent: Aug. 10, 2004

(54) SCALABLE MULTIDIMENSIONAL RING NETWORK

(75) Inventors: Peter Lothberg, Karlstad (SE); Anthony John Bates, Los Altos, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/535,437

(22) Filed: Mar. 23, 2000

Related U.S. Application Data

(63) Continuation-in-part of application No. 09/036,539, filed on Mar. 6, 1998, now Pat. No. 6,314,110.

(51) Int. Cl.[7] .................................................. H04J 3/22
(52) U.S. Cl. ....................................... 370/465; 370/406
(58) Field of Search ................................ 370/405, 406, 370/465, 466; 716/12

(56) References Cited

U.S. PATENT DOCUMENTS

| | | | | |
|---|---|---|---|---|
| 5,079,764 A | * | 1/1992 | Orita et al. ................. 370/403 |
| 5,125,076 A | * | 6/1992 | Faber et al. ................ 709/245 |
| 5,341,504 A | * | 8/1994 | Mori et al. .................... 712/12 |
| 5,471,589 A | * | 11/1995 | Akkawi et al. ............... 712/11 |
| 5,533,198 A | * | 7/1996 | Thorson ...................... 709/239 |
| 5,602,838 A | * | 2/1997 | Kartalopoulos ............. 370/406 |
| 5,734,580 A | | 3/1998 | Rakov |
| 5,841,775 A | | 11/1998 | Huang |
| 5,905,712 A | * | 5/1999 | Cresswell et al. .......... 370/238 |
| 5,999,541 A | * | 12/1999 | Hinchey et al. ............ 370/466 |
| 6,219,762 B1 | * | 4/2001 | Hasegawa et al. .......... 711/151 |
| 6,269,452 B1 | * | 7/2001 | Daruwalla et al. ............. 714/4 |
| 6,314,110 B1 | * | 11/2001 | Chin et al. .................. 370/468 |
| 6,430,700 B1 | | 8/2002 | Daruwalla et al. ............. 714/4 |
| 6,456,588 B1 | * | 9/2002 | Simmons .................... 370/216 |
| 6,505,289 B1 | * | 1/2003 | Han et al. ..................... 712/11 |
| 6,615,362 B1 | | 9/2003 | Daruwalla et al. ............. 714/4 |

* cited by examiner

Primary Examiner—Chi Pham
Assistant Examiner—Keith M. George
(74) Attorney, Agent, or Firm—Marger Johnson & McCollom, PC

(57) ABSTRACT

A multidimensional ring network includes a plurality of network processing devices that are connected together with a plurality of individual ring networks. Packets are sent between any two network processing devices on the same ring network. Intermediate network processing devices, located on that same ring, between the sending and receiving network processing devices, do not add additional hops to the packet transfer. The intermediate processing devices, between the sending and receiving devices, simply pass the packets through to the next processing device on that ring. The packets are passed through to the destination processing device without the intermediate network processing devices having to read or process the packet headers. This allows the number of network processing devices on the individual ring networks and the number of individual ring networks in the multidimensional ring network to be increased without adding additional hops, and the associated latency, between the network processing devices.

7 Claims, 8 Drawing Sheets

PORT ADAPTER

SCALABLE MULTIDIMENSIONAL RING NETWORK

The present application is a continuation in part of U.S. Ser. No. 09/036,539, filed Mar. 6, 1998, and now issued as U.S. Pat. No. 6,314,110.

BACKGROUND OF THE INVENTION

This invention relates to a novel network architecture and more particularly to a multidimensional ring network.

Networks, whether they are circuit switched or packet switched, face a common set of problems. One problem is input congestion. This happens when too much traffic is directed to the network inputs. Another problem is internal congestion. This happens when there is insufficient throughput bandwidth to handle the routing of packets or other information within the network. Another problem is output congestion. This happens when too much traffic is directed towards the same network output. Another problem is limited fault tolerance. This happens when a section of the network fails preventing the information from being routed to its intended destination. When a failure is detected, information is typically rerouted along an alternative network path. But internal network congestion is often created when more information is routed through the alternative path. This prevents or substantially delays the information from reaching a target destination.

To resolve these congestion problems, processing nodes are added to the network to increase the input, internal and output capacity. Additional or tandem processing nodes can also be used as standby nodes in case of network failures. Several problems arise from increasing the number of nodes, e.g., scaling a network. The complexity of wiring and interface circuitry substantially increases as the number of nodes in the network increases. Latency also increases as additional nodes are added to the network. This increase in latency is caused by the additional hops required for the information to travel between the additional nodes to get from a network input to a network output.

U.S. Pat. No. 5,841,775 issued Nov. 24, 1998 to Huang describes a switching fabric of routers used to implement a scalable switching network. The problem with this switching fabric architecture is that it uses point-to-point interconnections. When additional routers are added to the network, either the number of routers in each row is increased or another row of routers is added to the switching fabric. If additional routers are added to each row, the wiring and interface complexity between the routers in each row is substantially increased. Each additional row added to the switching fabric adds additional hops to the network that increases network latency. Thus, the switching fabric architecture described in Huang has only limited scalability.

Accordingly, a need remains for a scalable network architecture that does not significantly increase latency or significantly increase wiring complexity.

SUMMARY OF THE INVENTION

A multidimensional ring network includes a plurality of network processing devices that are connected together with a plurality of individual ring networks. Packets are sent between any two network processing devices on the same ring network. Intermediate network processing devices located on that same ring, between the sending and receiving network processing devices, do not add additional hops to the packet transfer.

The intermediate processing devices, between the sending and receiving devices, simply pass the packets through to the next processing device on that ring. The packets are passed through to the destination processing device without the intermediate network processing devices having to read or process the packet headers. This allows the number of network processing devices on the individual ring networks and the number of individual ring networks in the multidimensional ring network to be increased without adding additional hops, and the associated latency, between the network processing devices.

The multidimensional ring architecture in one embodiment is arranged into a three-dimensional cube having X, Y and Z axes. The individual ring networks in the architecture interconnect the network processing devices logically aligned along the same rows and columns in the same planes of the cube. The same associated rows and columns in each of the different planes of the cube are then interconnected with other ring networks. One or more of the ring networks can also interconnect nodes that are logically arranged along a diagonally-extending line within the same plane or a diagonal line that extends through the different planes.

The foregoing and other objects, features and advantages of the invention will become more readily apparent from the following detailed description of a preferred embodiment of the invention which proceeds with reference to the accompanying drawings.

DETAILED DESCRIPTION

Figure 1:
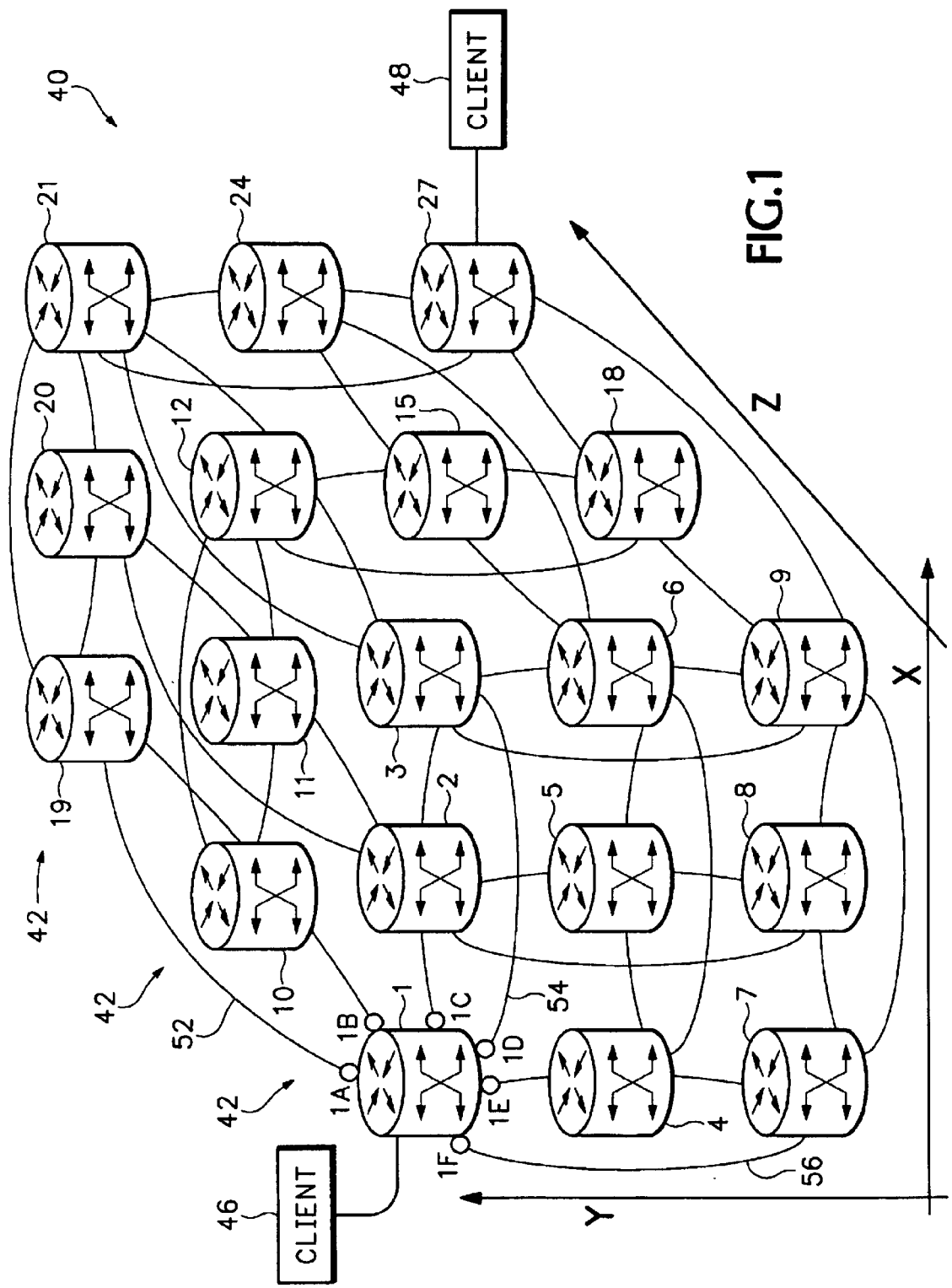
FIG. 1 is diagram of a multidimensional ring network according to one embodiment of the invention.
Figure 2:
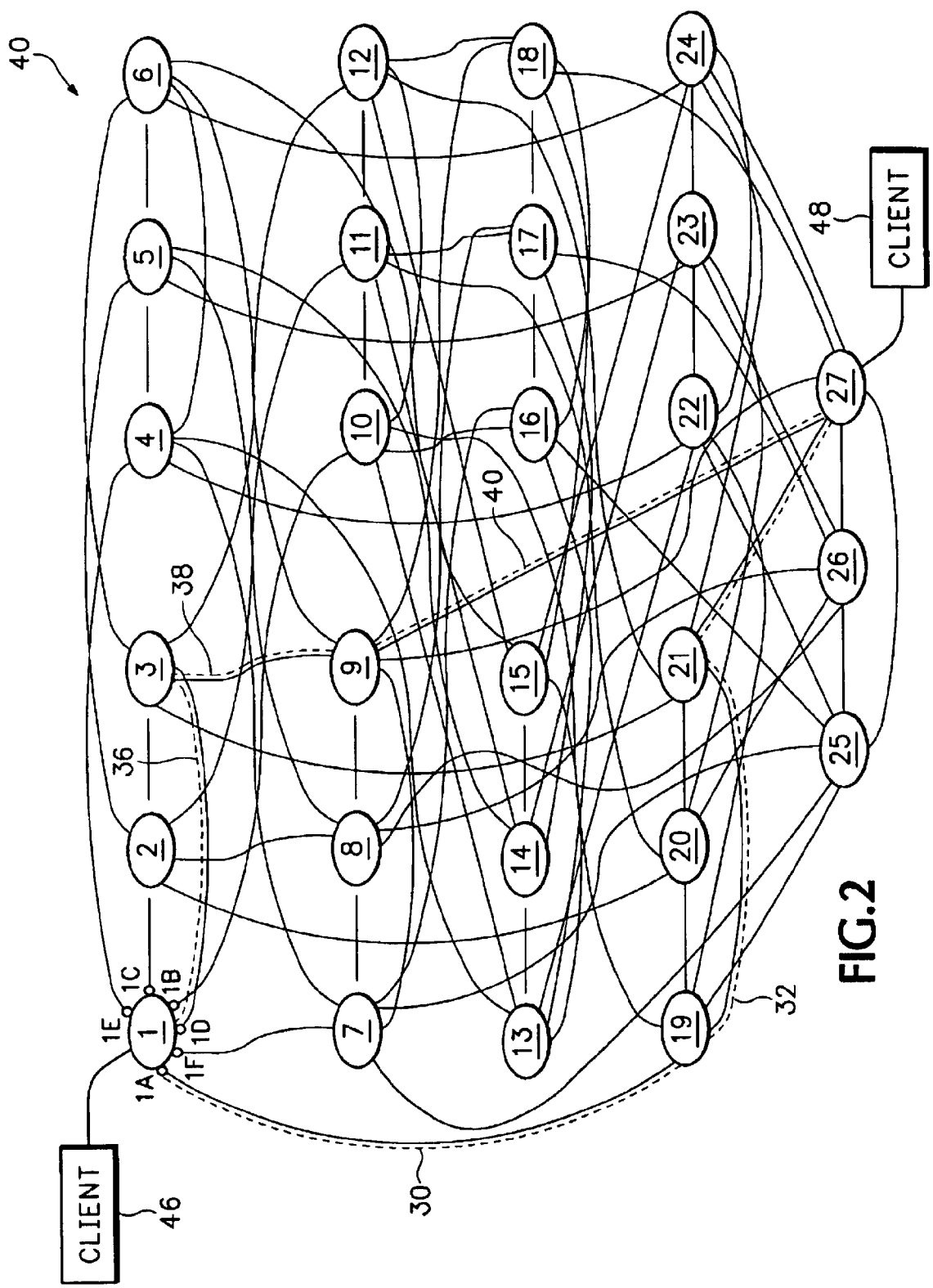
FIG. 2 is a connectivity map for the multidimensional ring network shown in FIG. 1.

FIG. 1 shows a multidimensional ring network (MRN) 40 according to one embodiment of the invention. The multidimensional ring network in FIG. 1 is configured into a 3×3×3 hypercube having multiple interconnected network processing nodes 42. FIG. 2 shows the connectivity map for the multidimensional ring network shown in FIG. 1. In one embodiment, the processing nodes 42 are high speed backbone routers. One example of a network processing node used with the multidimensional ring network is the Cisco Model No. 12012 router. However, any network router, switch or other device used for transferring information in a network can be used with the architecture shown in FIGS. 1 and 2.

A first client 46 is connected to one of the nodes 10 and a second client 48 is connected to a node 27. The clients 46 and 48 represent two of the numerous points of access into and out of the MRN 40. The clients 46 and 48 in one embodiment are computers, phones or any other device that is used to, send or receive information over the MRN 40. Each node 42 may have hundreds of ports for receiving and transmitting information with different clients. However, for simplicity, only clients 46 and 48 are shown in FIGS. 1 and 2.

A first vertical X-Y plane of the MRN 40 includes nodes 1–9. A second vertical X-Y plane includes nodes 10–18 and a third vertical X-Y plane in MRN 40 includes nodes 19–27. Nodes 13, 14, 16, 17, 22, 23, 25 and 26 are hidden in FIG. 1 but are shown in the corresponding connectivity diagram in FIG. 2.

The plurality of nodes are arranged into a plurality of node sets along the same X, Y, or Z axes. The multiple ring networks are connected together to form a matrix or lattice or ring networks. The ring networks that logically intersect with each other in the matrix or lattice, such as ring networks 52, 54 and 56, are each coupled to the node logically located at that intersection. In this case, node 1.

Figure 3:
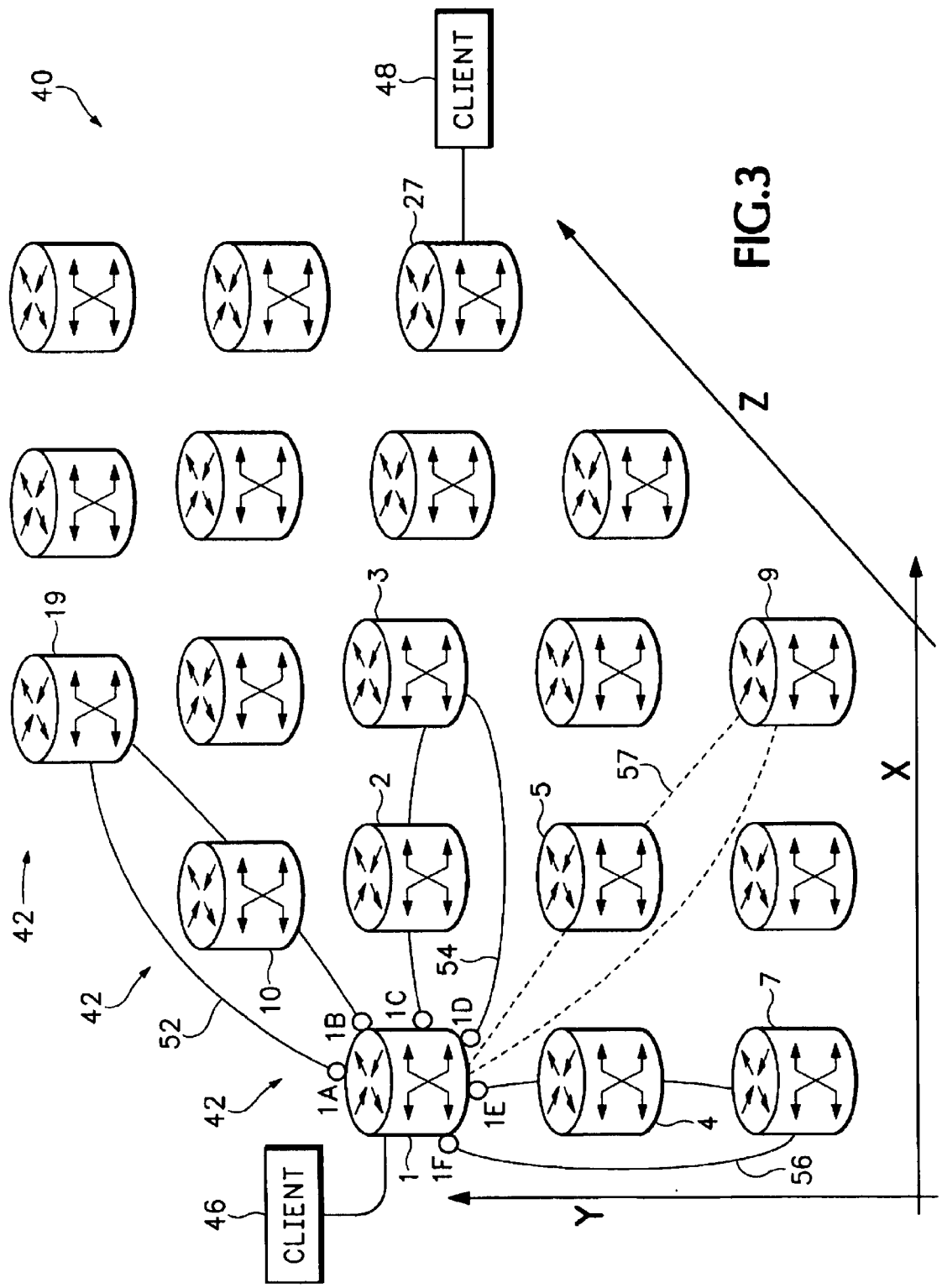
FIG. 3 shows the multidimensional ring network of FIG. 1 with the individual ring networks connected to a network processing node 1 shown in isolation.

For clarity, FIG. 3 shows an isolated view of only the three bi-directional rings 54, 56 and 52 that connect node 1 to other nodes in the same X, Y and Z axes, respectively. Node 1 is connected by ring 54 to the nodes 2 and 3 in the same X axis. Node 1 is connected by a second ring 56 to the nodes 4 and 7 located on the same Y axis, node 1 is also connected by a third ring 52 to the nodes 10 and 19 located on the same Z axis. Each node in MRN 40 is connected, in a manner similar to node 1, by separate rings to the nodes in the same associated X, Y and Z axes.

One or more of the ring networks can also interconnect nodes that are logically arranged along a diagonally-extending line within the same plane or a diagonal line that extends through the planes. For example, FIG. 3 shows a dotted line 57 representing a ring network coupling nodes 1, 5 and 9 together. Another diagonal ring network (not shown) can connect together the nodes along the diagonal line that extends between nodes 1 and 27.

It should be understood that the ring lattice network 40 in FIGS. 1 and 3 shows a logical connectivity relationship between the different nodes 42. The nodes 42 do not, and typically are not, physically arranged as shown in FIGS. 1 and 3.

Minimizing Hops in the MRN

A hop is a transfer between two adjacent nodes 42 where the header information in the packet is processed in order to determine the next destination for the packet. One of the substantial advantages of the invention is that there are a maximum of only three hops required to send information between any two nodes in the MRN 40, regardless of the X, Y, or Z dimensions of the MRN 40.

Each node 42 in the MRN 40 is connected to one or more rings. There is only one hop required to send a packet between any two nodes connected on the same ring. Any intermediate nodes located between the sending and receiving nodes simply receive the packets in buffers and then forward the packets to the next node on the ring. These intermediate nodes do not have to read the headers from the packets and then decode that destination address in the header to determine a next destination for routing the packet. Thus, the intermediate nodes do not add hops and contribute to latency in the MRN 40. This is explained in further detail below in FIGS. 5–9.

When the number of nodes are increased in network architectures, the number of intermediate nodes between a given sending node and a given receiving node increases. Each one of these additional intermediate nodes, when forwarding a packet from a sending node to a destination node, has to read the header for that packet, determine a routing path for that packet, and then send the packet out through an appropriate interface associated with the destination node. The intermediate nodes in the MRN 40, if on the same ring, do not have to process the packet headers. As mentioned above, the intermediate nodes simply pass the packet though a buffer without processing the packet header. Thus, increasing the number of nodes does not add hops, and associated latency, to the MRN 40. This is also explained in further detail in FIG. 4 below.

Referring to FIG. 2, the client 46 sends a packet directed to client 48. Client 46 is connected to node 1 and client 48 is connected to node 27 on the opposite end of the MRN 40. Only three hops are required to transfer the packets between node 1 and node 27. One three hop path between client 46 and client 48 includes a dashed line 30 representing a first hop from node 1 to node 19. A dashed line 32 represents a second hop from node 19 to node 21 and a dashed line 34 represents a final third hop from node 21 to node 27. It can be seen that the number of required hops is only associated with the number of different individual rings that the packet has to cross through when being transmitted from a source node to a destination node. The number of nodes in the ring is immaterial.

Another advantage of the invention is that there are multiple alternative paths that can be taken between nodes 1 and 27. For example, another three hop path between clients 46 and 48 comprises hops 36, 38 and 40. Because of the multitude of paths, the MRN 40 can reroute packets through alternate routes if a primary path is slow due to heavy network traffic congestion. Because there are a maximum of three hops between any two nodes, alternative paths can be taken in MRN 40 that do not add latency. Thus, the MRN 40 provides a wide variety of load balancing options to more efficiently route packets between different nodes. The MRN 40 also has an inherent redundancy that allows packets to be routed through these alternative paths when a primary path is down due to a network failure.

It takes a maximum of three hops to transfer packets between any two nodes 42 in MRN 40. However, many paths between nodes require fewer than three hops. For example, a packet transfer between node 1 and node 9 requires only two hops.

Figure 4:
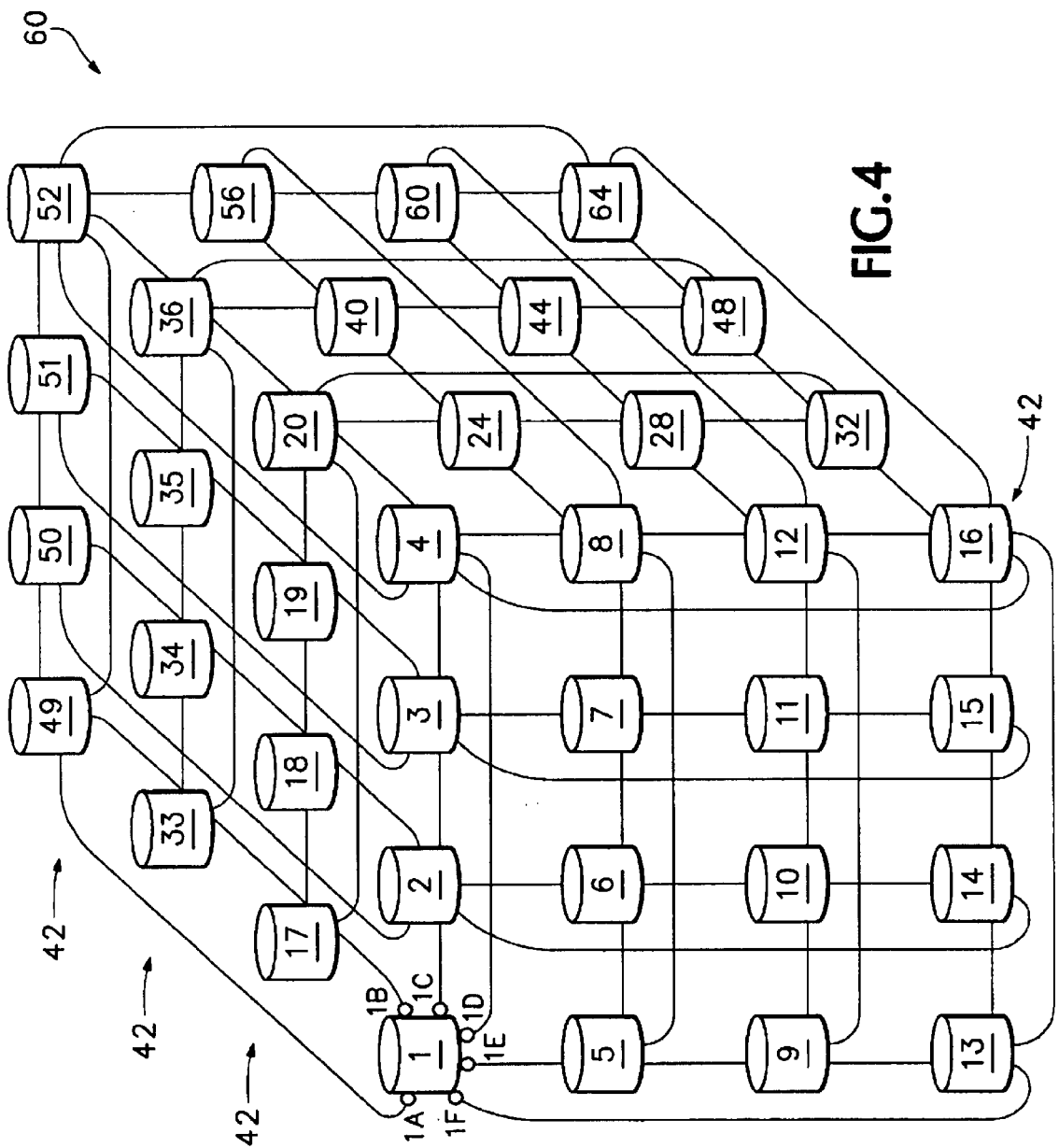
FIG. 4 is a diagram of a 4×4×4 multidimensional ring network according to another embodiment of the invention.

As stated above, a primary advantage of the invention is that the size of the MRN 40 can be increased without increasing the maximum number of hops required to transfer packets between two nodes. FIG. 4 shows a 4×4×4 MRN 60 that still only requires a maximum of three hops to transfer information between any two nodes 42.

Take, for example, a packet that is received at node 1 and is then transferred to node 11. It may appear that it requires 4 hops for the packet to be sent from node 1 to node 11. The packet taking one hop from node 1 to node 2, a second hope from node 2 to node 3, a third hop from node 3 to node 7 and then finally a fourth hop from node 7 to node 11. However, nodes 1, 2 and 3 are all on the same ring and nodes 3, 7 and 11 are on the same ring. Therefore, only one hop is required to send the packet from node 1 to node 3 and only one hop is required to send the packet from node 3 to node 11. Thus, the MRN 60 can be scaled to any number of nodes 42 without substantially increasing the number of hops in the network.

In another example, only 3 hops are required to send a packet from node 1 to node 44. A first hop is used to send the packet from node 1 to node 4, a second hop sends the packet from node 4 to node 36 and a third hop sends the packet from node 36 to node 44.

The dimensions of the MRN can also be increased without increasing the number of interconnections for each node 42. For example, the 3×3×3 hypercube shown in FIGS. 1–3 requires only six network interfaces (three interface pairs) to connect to the three individual X, Y, and Z network rings. This is represented by interfaces 1A–1F shown in FIGS. 1–3. The 4×4×4 hypercube shown in FIG. 4 still only requires six interfaces for each node 42. This is represented by interfaces 1A–1F on node 1 in FIG. 4. Thus, the same simple wiring scheme is maintained even when the dimensions of the MRN 40 are increased.

It is also important to note that the MRN 40 is not limited to a three-dimensional hypercube architecture. The MRN can be any multidimensional network architecture including a two-dimensional plane, a four-dimensional hypertetragonal, a five-dimensional hyperpentagonal, etc.

The MRN 40 can be used for a variety of different network applications, such as a concentrator used by an Internet Service Provider (ISP) for handling Internet calls from a large number of clients. The nodes 42 in FIGS. 1–4 in that case might represent network switching devices connected together via a backplane bus.

Alternatively, the MRN 40 can represent an Internet backbone where each node 42 represents a different network subsystem. Each node 42 can be either another MRN 40 or some other type of network. In this configuration, each node 42 may represent a network in a particular country, city or geographic region. Each X-Y vertical plane or each X-Z horizontal plane may be associated with a different geographic location, such as the west coast of the United States. In another application, some nodes 42 may comprise individual routing devices and other nodes 42 might comprise sub-networks with multiple individual routing devices.

The ring networks 52, 54, 56, etc. in one embodiment of the invention are bi-directional rings that transfer packets in both an upstream direction and a downstream direction. The ring networks connecting nodes 42 together can be implemented over Wide Area Network (WAN) links and/or Local Area Network (LAN) links and/or any other bus or backplane interconnection.

The particulars of the bi-directional ring architecture are described in two copending patent applications. The first patent application is U.S. Ser. No. 09/036,539 filed Mar. 6, 1998 and now issued as U.S. Pat. No. 6,314,110, entitled Method and Apparatus for Distributed Bandwidth Allocation for a Bi-Directional Ring Media with Spatial and Local Reuse and is herein incorporated by reference. The second patent application is U.S. Ser. No. 09/067,482 filed Apr. 27, 1998 and now issued at U.S. Pat. No. 6,269,452 entitled System and Method for Fault Recover for a Two Line Bi-Directional Ring Network and is herein incorporated by reference.

Figure 5:
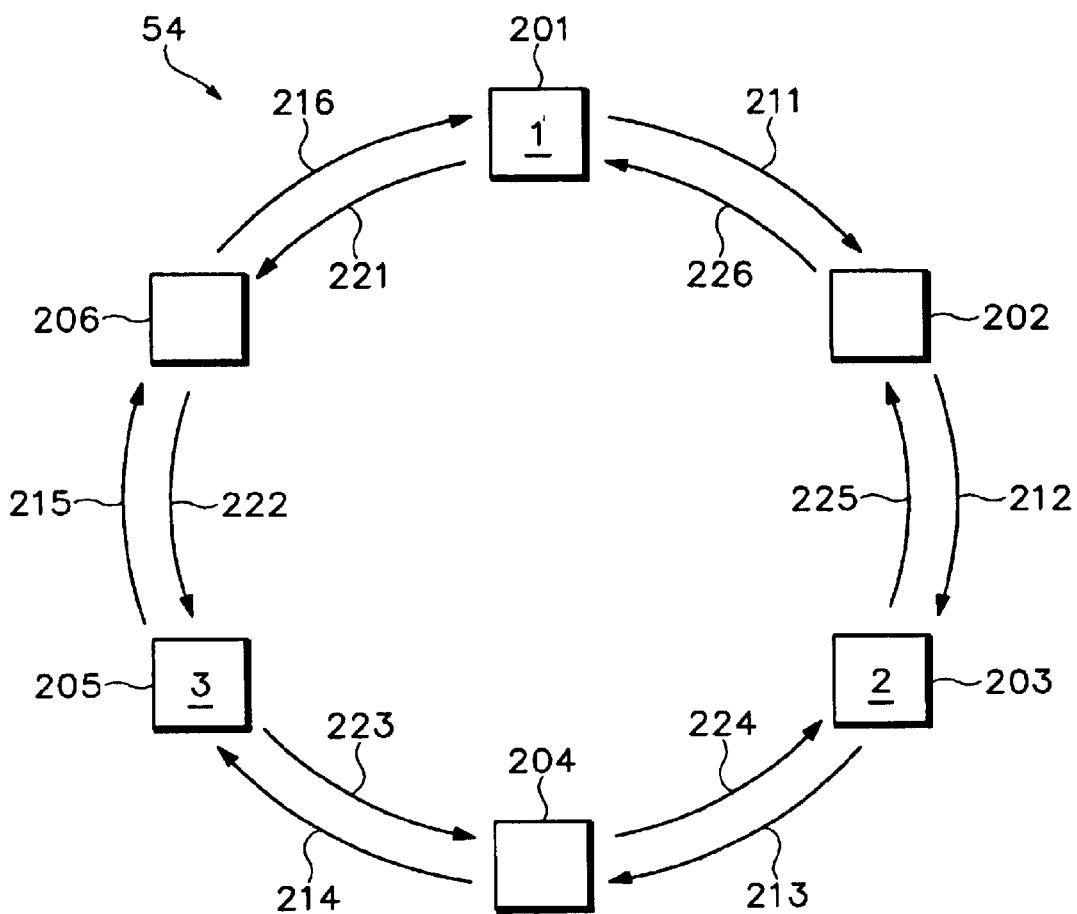
FIG. 5 is a schematic diagram illustrating one of the individual bi-directional ring networks used in the multidimensional ring network.

Details of the bi-directional ring network are described below in FIGS. 5–9. Referring to FIG. 5, a schematic diagram illustrates the bi-directional ring network for one of the rings 54 shown in FIGS. 1–3. The bi-directional ring network 54 uses a distributed bandwidth allocation scheme that allows for spatial and local reuse. This scheme is also referred to as the spatial reuse protocol. The spatial reuse protocol is preferably implemented on a bi-directional ring as shown. In certain embodiments, aspects of the spatial reuse protocol may also be implemented on a unidirectional ring. Bi-directional ring 54 includes nodes 201, 202, 203, 204, 205, and 206. For explanation purposes, assume node 201 corresponds with node 1 in FIG. 1, node 203 corresponds to node 2 in FIG. 1 and node 205 corresponds to node 3 in FIG. 1. Additional nodes 202, 204 and 206 are included to demonstrate a larger scale multidimensional ring configuration.

The nodes are connected by two rings. The outer ring includes links 211, 212, 213, 214, 215, and 216. The links on the outer ring send packets around the ring in a clockwise direction. The inner ring includes links 221, 222, 223, 224, 225, and 226. The links in the inner ring send packets around the ring in a counterclockwise direction.

Two types of information are sent on the rings, data and control information. Preferably, as data is sent downstream in a clockwise direction by the outer ring, control information for managing the data traffic on the outer ring is sent upstream or counterclockwise on the inner ring. Likewise, as data packets are sent downstream in a counter clockwise direction on the inner ring, control information for management traffic on the inner ring are sent upstream or clockwise on the outer ring. Thus, each ring uses the other to send control information in a direction that is opposite to the direction that data packets are traveling.

In one embodiment, separate control packets are not generated for the control information. Instead, control information for the other ring is piggybacked in each data packet as part of a packet header. If no data packets are being sent on one ring, then a special empty packet is generated so that control information is sent upstream for the other ring. Separate control packets may also be generated. For purposes of this discussion, whenever a control packet is referred to, it should be understood that a special control packet or part of a data packet, such as a space reserved in a data packet header, could also be used. Control information is carried upstream to nodes about the bandwidth that is available to other nodes downstream. As is described below, this information is used by each node to allocate to itself a fair amount of bandwidth for transmitting locally generated messages. In this context, a fair amount of bandwidth does not necessarily mean an exactly equal amount of bandwidth to other nodes, although it will be close to equal. The bandwidth is fairly determined by each node.

Each node implements the spatial reuse protocol by determining a fair amount of allocated bandwidth based on the bandwidth available to downstream nodes. Also, each node determines when control information should be sent upstream indicating that the node or nodes downstream are not receiving enough bandwidth. This is done by keeping track of four quantities: local transmit usage, downstream usage, allocated usage, and forward rate.

Local transmit usage is a measure of how much network bandwidth a node is using to transmit its own locally generated packets. Local transmit usage is measured a number of different ways in different embodiments, including as a running sum or a moving average. In one embodiment, local transmit usage is measured by incrementing an accumulator every time a packet is transmitted onto the network by a node. Preferably, the accumulator accumulates the number of bytes in each packet or else a scaled version of the number of bytes, that is, the number of bytes divided by a scaling factor to keep the numbers in a smaller range.

In certain alternative embodiments, a counter that simply counts the number of packets is used. Periodically, the accumulator is decreased by reducing the accumulator by a fraction of the total count. This is efficiently done by simply taking the binary value of the accumulator, shifting it a number of bits and subtracting the bit shifted count from the original count. This is a particularly desirable way of decreasing the accumulator because of its simplicity. For example, in one embodiment, the original count is shifted two bits and the bit shifted count is one fourth of the original count so that when the bit shifted count is subtracted, three fourths of the original count remain. In another embodiment, the original count is shifted by three bits and subtracted. Since shifting the count three bits yields a value that is one eighth of the original count, this procedure results in reducing the count by one eighth.

Thus, the local transmit usage accumulator is exponentially decaying over time while simultaneously being incremented by any local use of the network for transmitting data. Similarly, a forward rate is calculated based on the amount of data that the node is required to forward to the next node in the ring network. Just as with local transmit usage, the forward rate is calculated a number of different ways in different embodiments. A similar exponential decay and accumulator incrementing scheme to the one used to determine local transmit usage is preferred. Each time data is forwarded by the node, an accumulator representing the forward rate is incremented. Periodically, that accumulator is reduced by a fraction of the accumulator total.

Allocated usage is a quantity that is calculated by the node to determine how much bandwidth it should use for transmitting its own information. Allocated usage is allowed to grow over time towards a maximum allocated usage unless a message is received from a downstream node indicating that the allocated usage should be reduced so that the downstream node will have more bandwidth available to it. In one embodiment, allocated usage is periodically increased and also decreased whenever a message is received indicating that downstream available usage is less than the current allocated usage. When no downstream usage information is received, then allocated usage is increased periodically according to the following formula:

$$\text{Allocated usage} = \text{Allocated usage} + \frac{\text{Maximum usage} - \text{Allocated usage}}{\text{Growth Coefficient}}$$

Allocated usage is increased by a fraction of the difference between the maximum allowable usage and the current allocated usage. The fraction is determined by a growth coefficient which, along with the frequency of updating the allocated usage, determines how quickly allocated usage increases to maximum usage when no report of lower downstream available bandwidth available is received. The updating frequency and growth coefficient may be tuned in any given system to optimize performance based on the nature of the network traffic experienced. Increasing the growth coefficient causes the allocated usage to grow more slowly. It should be noted that the maximum usage may either be the maximum available bandwidth on the network or may also be some amount of bandwidth less than the total available bandwidth so that some network bandwidth is reserved for priority traffic. In addition, in one embodiment, the allocated usage is clipped at a value slightly less than the maximum usage.

When information is received about the downstream available bandwidth, then the allocated usage is averaged with the amount of bandwidth available downstream and then increased. In one embodiment this is done according to the following equation:

$$\text{Allocated usage} = \frac{\text{Allocated usage} + \text{Downstream bandwidth}}{2} + \frac{\text{Maximum usage} - \text{Allocated usage}}{\text{Growth Coefficient}}$$

Thus, the allocated usage is averaged with the downstream available bandwidth. This amount is then increased toward maximum usage. In one embodiment, the rate of increase controlled by the growth coefficient is selected to be less than the rate of increase when no downstream bandwidth information is available.

It should be noted that in different embodiments, many different equations are used to increase allocated usage upward towards maximum usage and decrease allocated usage downwards towards the available downstream bandwidth. The two equations shown above have the advantage of being relatively simple to implement in hardware while also effectively increasing allocated usage when no downstream bandwidth limiting information is received and decreasing the allocated usage towards the downstream bandwidth available when downstream bandwidth is lower than allocated usage.

It should be noted that downstream bandwidth is used to decrease allocated usage only when control information has been received indicating that downstream bandwidth is lower than allocated usage within a certain period of time. That period of time may be adjusted to tune the network according to the nature of the traffic on the network.

The description above shows how each node determines a fair amount of allocated usage for the node. When downstream nodes have limited bandwidth available for transmitting data, a message is sent upstream indicating the amount of bandwidth available to the downstream nodes. Each node evaluates control information received from downstream nodes and decreases its allocated usage if it has allocated more bandwidth to itself than downstream nodes are currently receiving. Before describing how each node uses the allocated bandwidth to determine whether or not to send data, it will be useful to consider an example of how network bandwidth is shared in a fair and efficient manner with spatial and local reuse when the nodes implement the spatial reuse protocol described above.

Returning to FIG. 5, consider a case where node 202 is transmitting to node 204 using links 212 and 213 on the outer ring. If no information is received by node 202 indicating downstream available bandwidth, the allocated usage for node 202 increases until it reaches the maximum allowed allocated usage. Thus, links 212 and 213 become completely devoted to carrying data transmitted by node 202. If node 203 needs to transmit to node 204, it immediately notices that it is forwarding data at a rate that prevents it from transmitting any of its own data onto the network. It has a very low local transmit usage and since its local transmit usage is less than its forward rate, it sends information upstream to node 202 indicating the available bandwidth for node 203. When node 202 receives indication of a low downstream available bandwidth, it decreases its allocated usage and reduces amount of its own data that it is transmitting on the network. Then, node 203 is able to transmit some of its own data onto the network.

The local transmit usage for node 203 increases and the downstream available bandwidth that is indicated to node 202 increases until eventually node 202 reduces its allocated bandwidth to a fair amount that allows node 203 to transmit onto the network and share the network bandwidth with node 202. If node 203 stops transmitting, then it no longer sends information indicating its available bandwidth upstream to node 202. The allocated usage for node 202 is then allowed to increase back towards the maximum allocated usage.

The forward rate is used by each node to determine whether or not downstream available bandwidth information should be forwarded upstream. Since, as described above, downstream allocated bandwidth is used by nodes to reduce the amount of bandwidth that is allocated for transmitting locally generated data, it is desirable that downstream allocated bandwidth not be forwarded to nodes that are not contributing to congestion. This is accomplished by having nodes only forward information indicating downstream available bandwidth if the local transmit usage of the node is less than the forward rate for the node. Thus, when a node receives information indicating downstream allocated bandwidth, the node determines whether or not its local transmit usage exceeds its forward rate. If its local transmit usage exceeds the forward rate, then the traffic congestion experienced downstream is caused primarily by that node and not by upstream nodes. Therefore, the node does not forward the downstream allocated bandwidth upstream. This enables the network to efficiently achieve local reuse.

It should be noted that in one embodiment, local transmit usage is compared to the minimum downstream available network bandwidth received plus a small constant. The addition of the small constant prevents a very small minimum downstream available network bandwidth from circulating for a long period when it should be increasing.

A number of variations of the calculations described above are used in addition to or instead of the methods described for calculating the local transmit usage and forward rate. For example, in certain embodiments, instead of sending local transmit usage calculated in the manner described above upstream, a time weighted average of the local transmit usage is used. In one embodiment, the time weighted average of the local transmit usage is calculated so that the time weighted average of the local transmit usage tends to decrease more slowly than it increases. Similarly, in certain embodiments, a time weighted average of the forward rate is used in some embodiments. Also, when a quantity such as local transmit usage is decayed exponentially by periodically subtracting a fraction of the quantity, then, in some embodiments, a minimum constant is actually subtracted when the fraction of the quantity decreases below the minimum constant.

In the example described above, node 202 recognizes that its local transmit usage is greater than its forward rate and does not forward the downstream available bandwidth for node 203 to node 201. This is desirable because network congestion on link 213 is caused by the data transmitted by node 202. Thus, nodes 201, 206, 205, and 204 will not be caused to reduce their allocated bandwidth as a result of the congestion occurring between nodes 202 and 204 and local reuse is achieved. Fair spatial reuse is also achieved because in areas where congestion occurs such as link 213, allocated bandwidth is adjusted for the node that caused the congestion, in this case, node 202.

It should be noted that decisions whether or not to send information upstream indicating downstream available bandwidth are made by each node when the node has locally generated data that it needs to transmit on the network. The following description will show how each individual node determines whether it can send data on the network based on the state of its transit buffer and its allocated usage.

Figure 6:
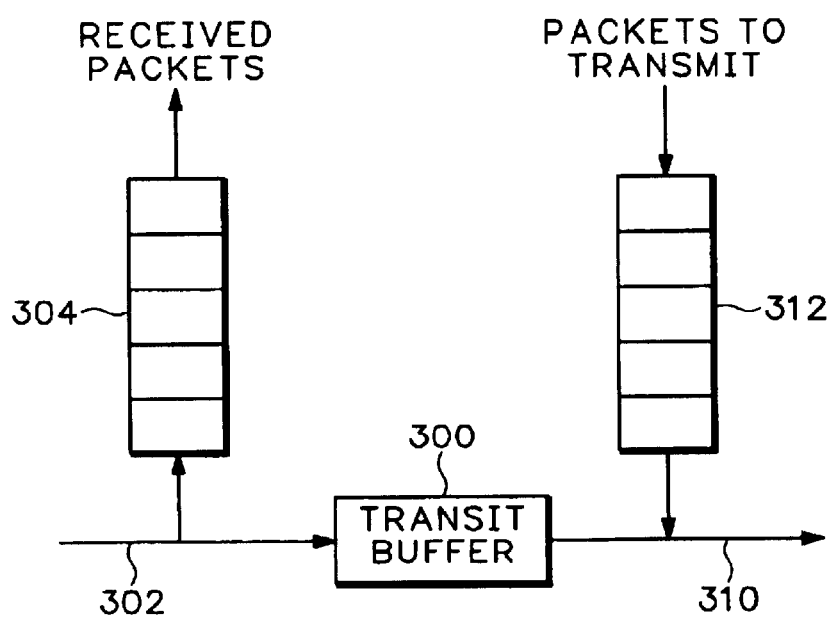
FIG. 6 is a schematic diagram illustrating how a transit buffer 300 is used by a node to forward information on the bi-directional ring network shown in FIG. 5.

FIG. 6 is a schematic diagram illustrating how a transit buffer 300 is used by a node to forward information on the network. Packets are received by the node on an input link 302 and packets which are intended for the node are sent to a received packet buffer 304. Packets which are being forwarded are added to transit buffer 300. Packets in transit buffer 300 are transmitted on output link 310 to the next downstream node. In addition to packets from transit buffer 300 that are being forwarded, the node may also transmit its own packets from a packet transmission buffer 312 onto output link 310. Before transmitting packets from packet transmission buffer 312, the node must first check to make sure that the transit buffer is not full. The amount of data in the transit buffer is sometimes referred to as the depth of the transit buffer.

Actually, the node checks whether the amount of data stored in the transit buffer is less than a certain threshold. The threshold is usually some amount below the full capacity of the transit buffer to allow for a safety factor to prevent packets from being dropped that are supposed to be forwarded. Additionally, in one embodiment, the threshold is further reduced to allow for priority data. When the node wants to transmit its own packets onto the network from the packet transmission buffer and it determines that its ability to do so is limited by packets being forwarded from upstream nodes through the transit buffer, then that node piggybacks information indicating the amount of bandwidth that is available to the node on a packet that is sent upstream. In one embodiment, space is reserved in packet headers for downstream available bandwidth information. By indicating its local transmit usage to upstream nodes that implement the spatial reuse protocol, the downstream node insures that it will eventually have available to it a fair amount of network bandwidth. The process by which a node determines whether or not to send downstream available bandwidth information upstream and whether or not to transmit its own packets when the transit buffer is below the threshold is further described below.

Figure 7:
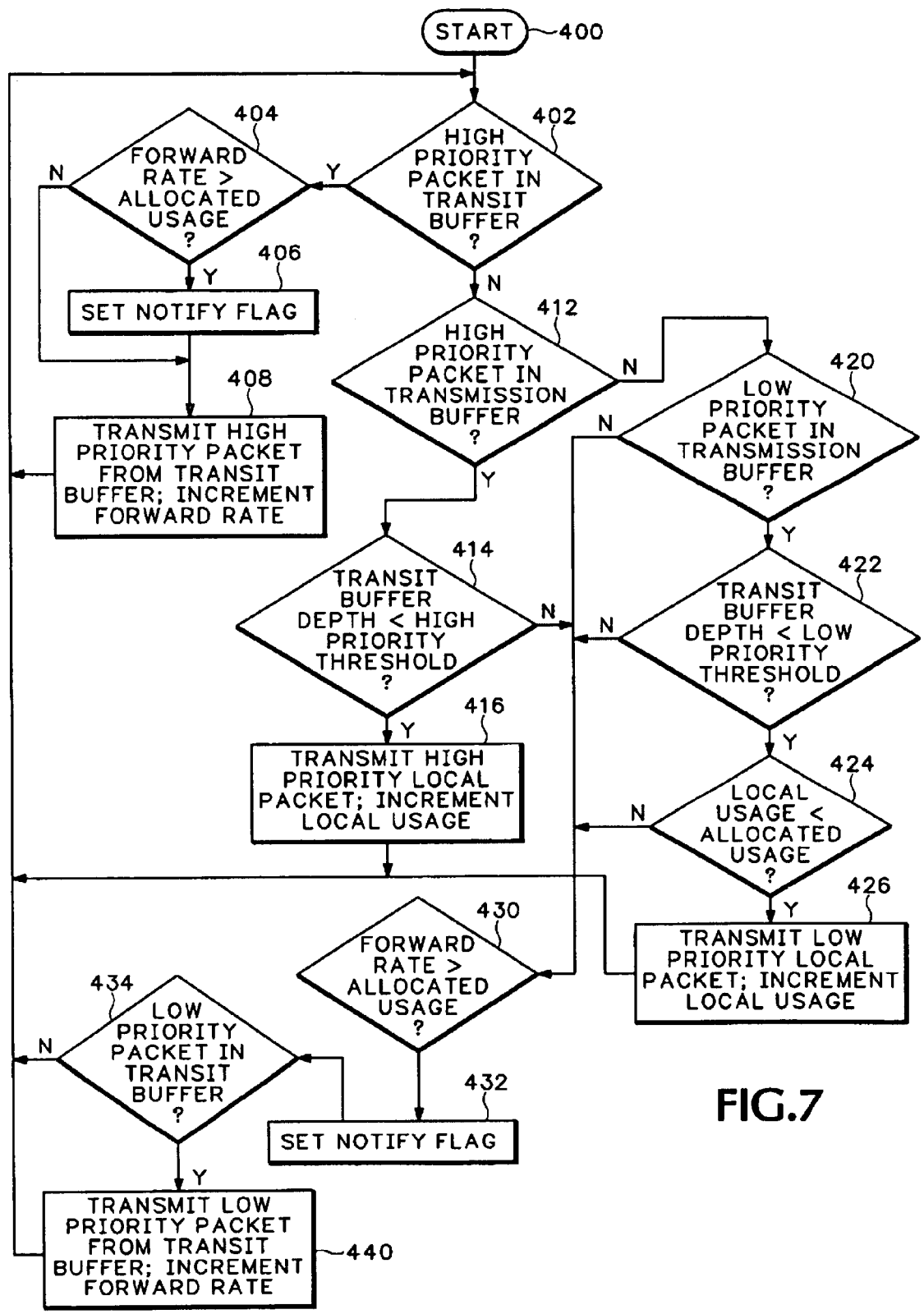
FIG. 7 is a process flow diagram illustrating a process implemented on each node for determining whether to transmit locally generated packets downstream on the network and whether to transmit downstream available bandwidth information upstream.

FIG. 7 is a process flow diagram illustrating a process implemented on each node for determining whether to transmit locally generated packets downstream on the network and whether to transmit downstream available bandwidth information upstream. The process starts at 400. In a step 402 the node determines whether or not the transit buffer has a high priority packet in it. If it does, then control is transferred to a step 404 where the node determines whether or not its forward rate is greater than its allocated usage. If the forward rate is greater than its allocated usage, then control is transferred to a step 406 and a flag is set indicating that a notification of downstream available bandwidth should be forwarded upstream. As described above, when upstream packets are sent, downstream available bandwidth is then included with the packets in the packet header. The time that the flag remains set may be adjusted to tune performance.

Once step 406 is executed, or if the forward rate is less than or equal to the allocated usage, control is transferred to a step 408. In step 408, the high priority packet is forwarded from the transit buffer to the next downstream node.

If the transit buffer does not have a high priority packet, then control is transferred to a step 412 and it is determined whether or not the local transmission buffer has a high priority packet. If the local transmission buffer has a high priority packet, then control is transferred to a step 414. In step 414, the node checks whether or not the amount of data in the transit buffer is less than the high priority threshold. If the transit buffer threshold for high priority packets has not been reached, then control is transferred to a step 416. The high priority packet is transmitted on the output link and local transmit usage is incremented. Control is then transferred back to start and the process is repeated.

If, in step 412, it is determined that the transmission buffer does not have a high priority packet, then control is transferred to a step 420. In step 420, it is determined whether or not the transmission buffer has any low priority packets in it. If the transmission buffer has a low priority packet, then control is transferred to a step 422. In step 422, the transit buffer is checked to determine whether or not the amount of information in the transit buffer is less than the threshold for low priority transmission by the node. If the transit buffer is below the low priority transmission threshold, then control is transferred to a step 424 where it is determined whether or not local transmit usage exceeds allocated usage. If local transmit usage does not exceed allocated usage, then control is transferred to a step 426 and the low priority locally generated packet is transmitted onto the ring network. Control is then transferred back to start and the process is repeated.

Thus, the decision to send packets from the transit buffer or the transmission buffer is made based on whether local transmit usage exceeds allocated usage and on whether the transit buffer is full. In addition, high priority packets in the transit buffer are always transmitted immediately and high priority packets in the transmission buffer are transmitted regardless of whether local transmit usage exceeds allocated usage. Locally generated high priority packets also have a higher transit buffer threshold than low priority packets. In the embodiment described, high priority packets sent cause local transmit usage to be incremented so that even though an exception is made from the allocated usage, overall fairness is maintained. In most embodiments, however, it is preferred that high priority packets do not increment local transmit usage.

If it is determined in step 420 that the transmission buffer contains no low priority packets, or if it is determined in step 422 that the transit buffer depth exceeds the low priority local transmission threshold, or if it is determined in step 424 that the local transmit usage exceeds the allocated usage for the node, or if it is determined in step 424 that the transit buffer depth exceeds the high priority threshold, then control is transferred to a step 430. In step 430, the node checks whether or not the forward rate exceeds the allocated usage for the node. If the forward rate exceeds the allocated usage, then a flag indicating that notifications should be sent in the upstream direction is set in step 432. Whether or not the flag is set, control is transferred to step 434 where it is determined whether or not the transit buffer contains any low priority packets. If the transit buffer contains a packet, the packet is sent in a step 440. Once the packet is sent, if any, control is transferred back to start and the process is repeated.

Thus, the process described in FIG. 7 shows how the node is continually checking the transit buffer and the transmission buffer for packets. High priority packets in the transit buffer are immediately sent, if there are any. High priority packets in the transmission buffer are forwarded whenever the transit buffer depth is less than the high priority threshold. Local transmit usage is compared to allocated usage to determine whether low priority packets in the transmission buffer should be sent or whether low priority packets from the transit buffer should be forwarded. Low priority packets from the transmission buffer are transmitted onto the network only if the transit buffer depth is less than the low priority local transmission threshold. Low priority packets from the transit buffer are forwarded whenever other packets are not being transmitted.

Whenever a packet is forwarded, the forward rate is incremented and whenever a locally generated packet is transmitted onto the network, local transmit usage is incremented. Whenever it is determined that the forward rate is greater than the allocated usage, a flag is set indicating that a downstream bandwidth notification should be sent. The downstream available bandwidth used in the notification is the minimum of any received bandwidth and the local transmit usage.

Thus, the node regulates the amount of it own traffic that it transmits on the network according to its allocated usage and the node sends information upstream indicating downstream available bandwidth when local transmit usage is less than allocated usage.

Figure 8:
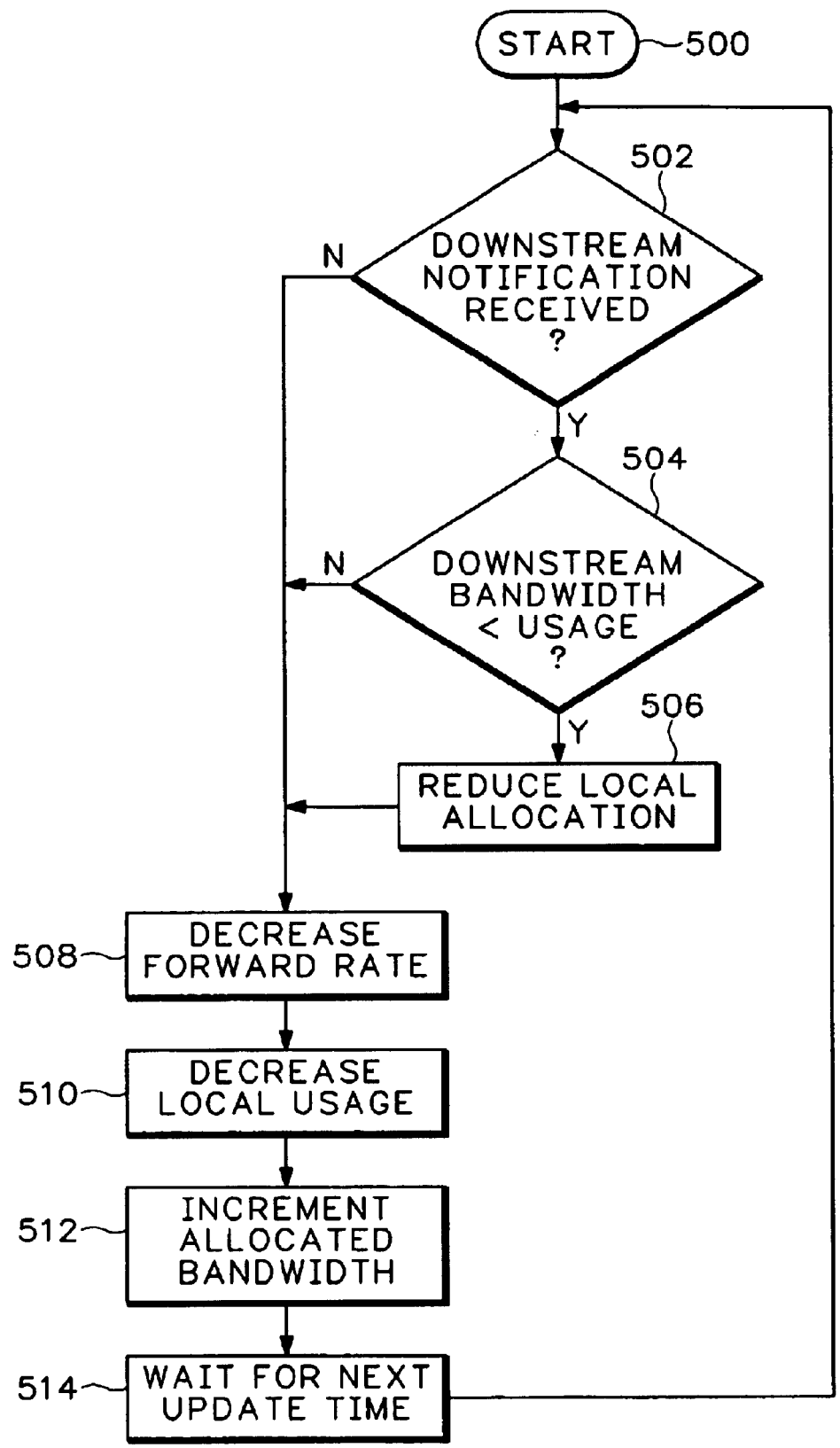
FIG. 8 is a process flow diagram illustrating a process for updating forward rate, local transmit usage, and allocated bandwidth.

FIG. 8 is a process flow diagram illustrating a process for updating forward rate, local transmit usage, and allocated bandwidth. The process starts at 500. In a step 502, it is determined whether a downstream notification has been received within a set period. If a notification was received, then control is transferred to a step 504 and it is determined whether downstream bandwidth is less than local transmit usage. If it is, then the local allocation is reduced in a step 506. Control is then transferred to a step 508 and the forward rate is decreased. Next, local transmit usage is decreased in a step 510 and allocated bandwidth is incremented in a step 512. The system then pauses until the next update time in a step 514 before control is transferred back to start and the process is repeated.

Figure 9:
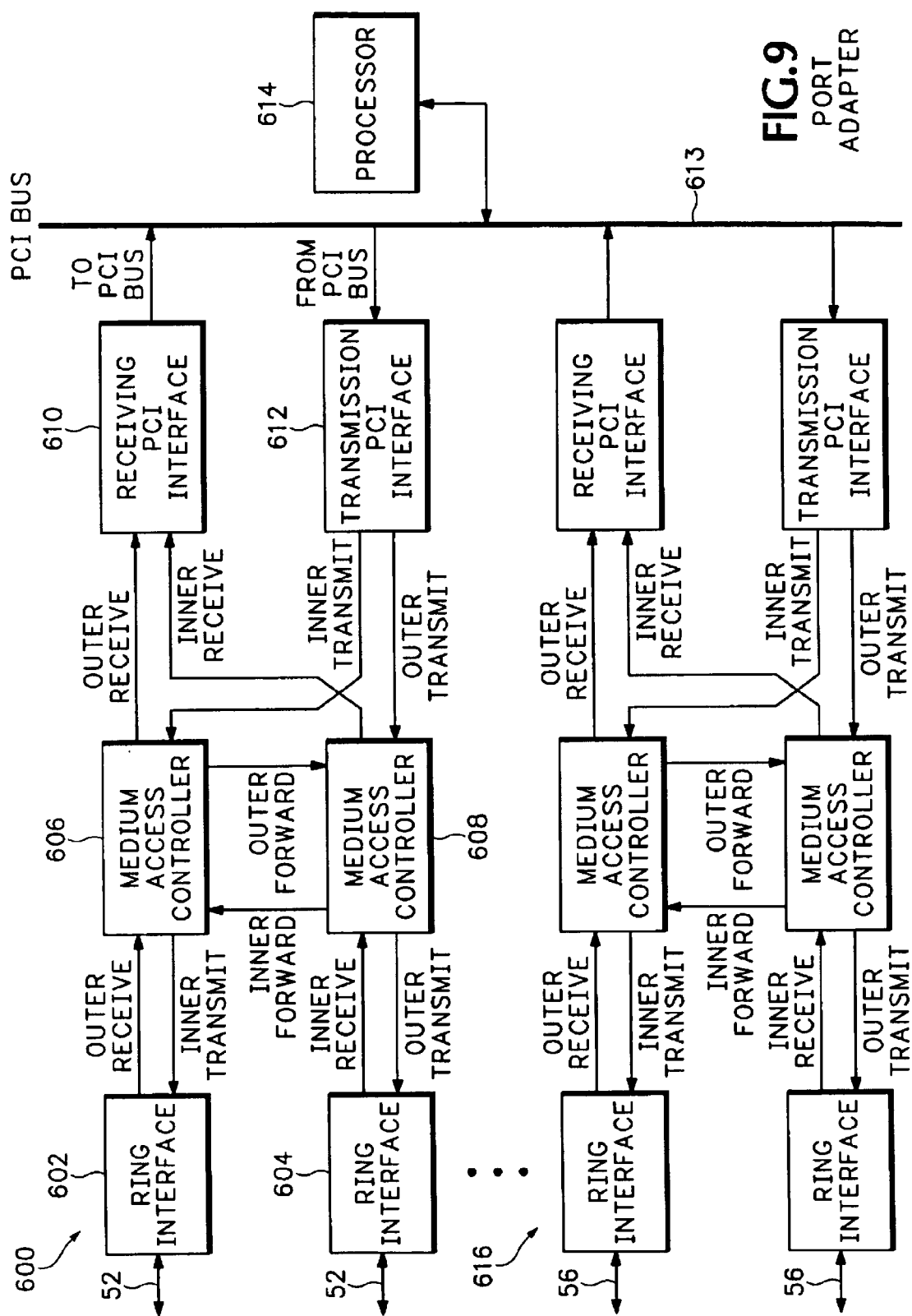
FIG. 9 is a block diagram illustrating the interfaces on a node that transfers data to and from a PCI bus used by the node for internal data routing.

FIG. 9 is a block diagram illustrating an interface on a node that transfers data to and from a PCI bus used by the node for internal data routing. A bi-directional ring interface 600 includes a pair of ring interfaces 602 and 604 that provide access to a bi-directional ring 52 such as the one depicted in FIG. 5. Bi-directional ring interface 600 also includes a pair of medium access controllers 606 and 608. Ring interface 602 receives packets from the outer ring and transmits packets to the inner ring. Ring interface 604 receives packets from the inner ring and transmits packets to the outer ring. Packets received by ring interface 602 from the outer ring are processed by medium access controller 606. Packets that are to be forwarded to the outer ring are sent to medium access controller 608 which transmits them to the outer ring via ring interface 604.

Medium access controller 606 and medium access controller 608 both forward packets for the node to a receiving PCI interface 610, which transfers data to a PCI bus 613. Medium access controller 606 and 608 receive packets from the PCI bus to be transmitted on the inner and outer rings via transmission PCI interfaces 610 and 612. Thus, the medium access controllers 606 and 608 receive packets for the node and forward packets over ring interfaces 602 and 604 to ring 52.

There is a separate interface as described above for each different ring network connected to the node. A second bi-directional ring interface 616 is used in the node to connect to ring network 56. A third bi-directional ring interface (not shown) is used to connect to ring network 54.

A first ring protocol as described above in FIGS. 5–8 is used by a processor 606 to transfer packets between the nodes 1, 10 and 19 on ring 52, a second ring protocol as described above in FIGS. 5–8 is used by processor 606 to transfer packets between the nodes 1, 2 and 3 on ring 54, and a third ring protocol as described above is used by processor 606 to transfer packets between the nodes 1, 4 and 7 on ring 56. The processor 606 transfers packets between the different rings 52, 54 and 56 using any conventional routing algorithm used to route packets between different networks. The same bi-directional interface circuitry is used for each node in MRN 40.

Having described and illustrated the principles of the invention in a preferred embodiment thereof, it should be apparent that the invention can be modified in arrangement and detail without departing from such principles. I claim all modifications and variation coming within the spirit and scope of the following claims.

What is claimed is:

1. A multidimensional ring network, comprising:

a plurality of nodes arranged into a plurality of node sets;

multiple ring networks each coupling three or more of the nodes in one of the node sets together;

the multiple ring networks connected together to form a logical 3 or more dimensional ring matrix network where each dimension of the 3 or more dimensional ring matrix network includes three or more of the ring networks and the nodes at each logical edge of the ring matrix network are coupled directly to the nodes at each opposite corresponding edge of the ring matrix network;

network interfaces for each one of the nodes configured to send and receive packets in an upstream direction and a downstream direction on the ring networks; and packet controllers on each one of the nodes configured to allocate a bandwidth for locally generated network packets sent in the downstream direction wherein the packet controller determines a minimum downstream available network bandwidth available in the downstream direction from information received in the upstream direction and adjusts the local allocated bandwidth based on the minimum downstream available network bandwidth, periodically increasing the local allocated bandwidth toward a maximum local allocated bandwidth and wherein the packet controller uses the local allocated bandwidth to govern whether a class of locally generated network packets are sent in the downstream direction.

2. A ring architecture, comprising:

multiple network processing nodes logically arranged along multiple axes;

multiple ring networks each connecting together at least three of the network processing nodes that are logically arranged along a same axes, each one of the multiple ring networks connecting all of the nodes on the same axes together in sequence and connecting the nodes on opposite ends of the same axes directly together in a ring configuration, at least three of the ring networks logically coupling the network processing nodes together along at least three first parallel axes and at least three additional ring networks logically coupling the same network processing nodes together logically along at least three second axes perpendicular to the first axes to form a first at least 3×3 lattice interconnected ring network where each one of the network processing nodes on the ends of the lattice are directly coupled to the network processing nodes on corresponding opposite ends of the lattice;

additional at least 3×3 lattice interconnected ring networks formed along each axis of the first lattice interconnected ring network;

network interfaces for each one of the nodes configured to send and receive packets in an upstream direction and a downstream direction on the ring networks; and packet controllers on each one of the nodes configured to allocate a bandwidth for locally generated network packets sent in the downstream direction wherein the packet controller determines a minimum downstream available network bandwidth available in the downstream direction from information received in the upstream direction and adjusts the local allocated bandwidth based on the minimum downstream available network bandwidth, periodically increasing the local allocated bandwidth toward a maximum local allocated bandwidth and wherein the packet controller uses the local allocated bandwidth to govern whether a class of locally generated network packets are sent in the downstream direction.

3. A network architecture according to claim 2 wherein the ring lattice networks each arranged in planes defined by each of the X, Y, and Z axes.

4. A network architecture according to claim 3 wherein a maximum of three hops exists between any two network processing nodes.

5. A network architecture according to claim 4 wherein each network processing node has ring interfaces for separately connecting to each one of the ring networks that logically intersect at that network processing node.

6. A network architecture according to claim 5 wherein a first one of the ring interfaces connects to one of the ring networks associated with an X axis, a second one of the ring interfaces connects to one of the ring networks associated with a Y axis that intersects with the ring network associated with the X axis, and a third one of the ring interfaces connects to one of the ring networks associated with a Z axis that intersects with the ring network associated with the X axis and the ring network associated with the Y axis.

7. A network architecture according to claim 6 wherein a fourth one of the ring interfaces connects to one of the ring networks associated with a fourth axis that intersects with the ring networks associated with the X, Y, and Z axes.

* * * * *